United States Patent [19]
Tanabe et al.

[11] Patent Number: 5,420,654
[45] Date of Patent: May 30, 1995

[54] SHUTTER BLADE DEVICE

[75] Inventors: Yoshiaki Tanabe; Hiroyuki Ohshima, both of Yokohama, Japan

[73] Assignee: Nikon Corporation, Tokyo, Japan

[21] Appl. No.: 145,206

[22] Filed: Nov. 3, 1993

[30] Foreign Application Priority Data

Nov. 5, 1992 [JP] Japan .................................. 4-295456

[51] Int. Cl.[6] .............................. G03B 9/40; G03B 9/10
[52] U.S. Cl. ...................................... 354/246; 354/250
[58] Field of Search ................ 354/245, 246, 249, 250, 354/248

[56] References Cited

U.S. PATENT DOCUMENTS

| | | | |
|---|---|---|---|
| 4,162,840 | 7/1979 | Ooba et al. | 354/246 |
| 4,295,726 | 10/1981 | Inoue | 354/246 |
| 4,373,797 | 2/1983 | Shimada et al. | 354/234 |
| 4,382,670 | 5/1983 | Hashimoto et al. | 354/246 |
| 4,975,722 | 12/1990 | Suzuki et al. | 354/246 |

FOREIGN PATENT DOCUMENTS 61-251830 11/1986 Japan .

*Primary Examiner*—M. L. Gellner
*Assistant Examiner*—Nicholas J. Tuccillo
*Attorney, Agent, or Firm*—Shapiro and Shapiro

[57] ABSTRACT

A shutter blade device having two arms, plural shutter blades and caulking pins for rotatably mounting the shutter blades to the arms is designed to secure the strength of the shutter blades, thereby enabling high-speed running motion. For this purpose, the shutter blades are formed planar, and the caulking pins are so caulked that the caulked portions protrude to the rear side of the shutter blades. Between the adjacent shutter blades, blades are so formed that the protruding portions of caulking always overlap with the adjacent shutter blade, regardless whether the blades are in the light-shielding position, in the exposure position or in the course of running therebetween.

3 Claims, 7 Drawing Sheets

SHUTTER BLADE DEVICE

BACKGROUND OF THE INVENTION

1. Field of the Invention

The present invention relates to a shutter blade device, and more particularly to a blade device of a vertically running focal plane shutter.

2. Related Background Art

There will be explained a conventional shutter blade device, with reference to the attached drawings.

FIGS. 4 to 6 and 8 illustrate a conventional shutter blade device.

Referring to FIG. 4, a shutter base plate 1 is provided with an aperture 1a, and shafts 1b, 1c. An auxiliary arm 2 is rotatably mounted on the shaft 1b. A driving arm 3 is provided with a hole 3a and is rotatably mounted on the shaft 1c. A slit blade 4 is rotatably mounted, on the auxiliary arm 2 by a pin 4a, and on the driving arm 3 by a pin 4b. Similarly, cover blades 5, 6, 7 are rotatably mounted, on the auxiliary arm 2 respectively by pins 5a, 6a, 7a, and on the driving arm 3 respectively by pins 5b, 6b, 7b.

In the conventional shutter blade device, when the slit blade 4 and the cover blades 5, 6, 7 are retracted from the aperture 1a and mutually superposed as shown in FIG. 4, the pins 4a, 5a, 6a are superposed respectively with the cover blades 5, 6, 7, while the pins 5b, 6b are not superposed with the adjacent cover blades 6, 7.

On the other hand, when the slit blade 4 and the cover blades 5, 6, 7 are extended as shown in FIG. 6, the pins 4a, 5a, 6a are not superposed with the adjacent cover blades 5, 6, 7 while the pins 5b, 6b are superposed with the adjacent cover blades 6, 7. In this manner the pins 5a, 6a, 7a, 5b, 6b repeatedly assume a state superposed with the adjacent cover blades and a non-superposed state, with the movement of the shutter blades.

In the course of running motion of the shutter blades, there exits a state shown in FIG. 5, where the pin 4a is released from overlapping with or starts to overlap with the cover blade 5. A similar position exists also for each of other pins 5a, 6a, 5b, 6b.

FIG. 8 is a cross-sectional view along a line A—A in FIG. 5. As shown in FIG. 8, there is required a step t1 for each of said pins 4a, 5a, 6a, 5b, 6b. Without such step t1, a projection t2 formed by caulking collides with the cover blade 5, thereby damaging said blade (see FIG. 9). When the step t1 shown in FIG. 8 is intended to be formed for avoiding such drawback, the slit blade 4 has to be provided with a bent portion 4e. Said bent portion 4e shows a lowered strength than in the peripheral area, because of stress concentration in the caulked or bent portion, crack formation in the bent portion or hardening by working, thereby becoming inadequate for a high-speed shutter.

SUMMARY OF THE INVENTION

In consideration of the foregoing, object of the present invention is to provide a shutter blade device capable of securing the strength of the blades, thereby enabling high-speed running motion.

The above-mentioned object can be attained, according to the present invention, by a shutter blade device comprising two arms, plural light-shielding blades, and caulking pins for rotatably mounting said light-shielding blades on said arms, wherein said light-shielding blades are formed planar while the caulking is conducted in such a manner that the caulked portions of said caulking pins protrude to the rear side of said light-shielding blades, and the adjacent light-shielding blades are so formed that the protruding portions of said caulking pins always overlap with the adjacent blade regardless whether said blades are in the light-shielding position or in the exposure position.

Such configuration allows caulking without the bent portions in the conventional art, thereby securing the strength of the shutter blades and enabling high-speed running motion.

BRIEF DESCRIPTION OF THE DRAWINGS

FIG. 1 is a view of a shutter blade device embodying the present invention, in a state in which the shutter blades thereof are mutually superposed to expose the aperture 1a;

FIG. 3 is a view of the shutter blade device embodying the present invention, in a state in which the shutter blades thereof are extended to cover the aperture 1a;

FIG. 4 is a view of a conventional shutter blade device in a state in which the shutter blades thereof are mutually superposed to exposure the aperture 1a;

FIG. 6 is a view of the conventional shutter blade device in a state in which the shutter blades thereof are extended to cover the aperture 1a;

DESCRIPTION OF THE PREFERRED EMBODIMENTS

Figure 1:
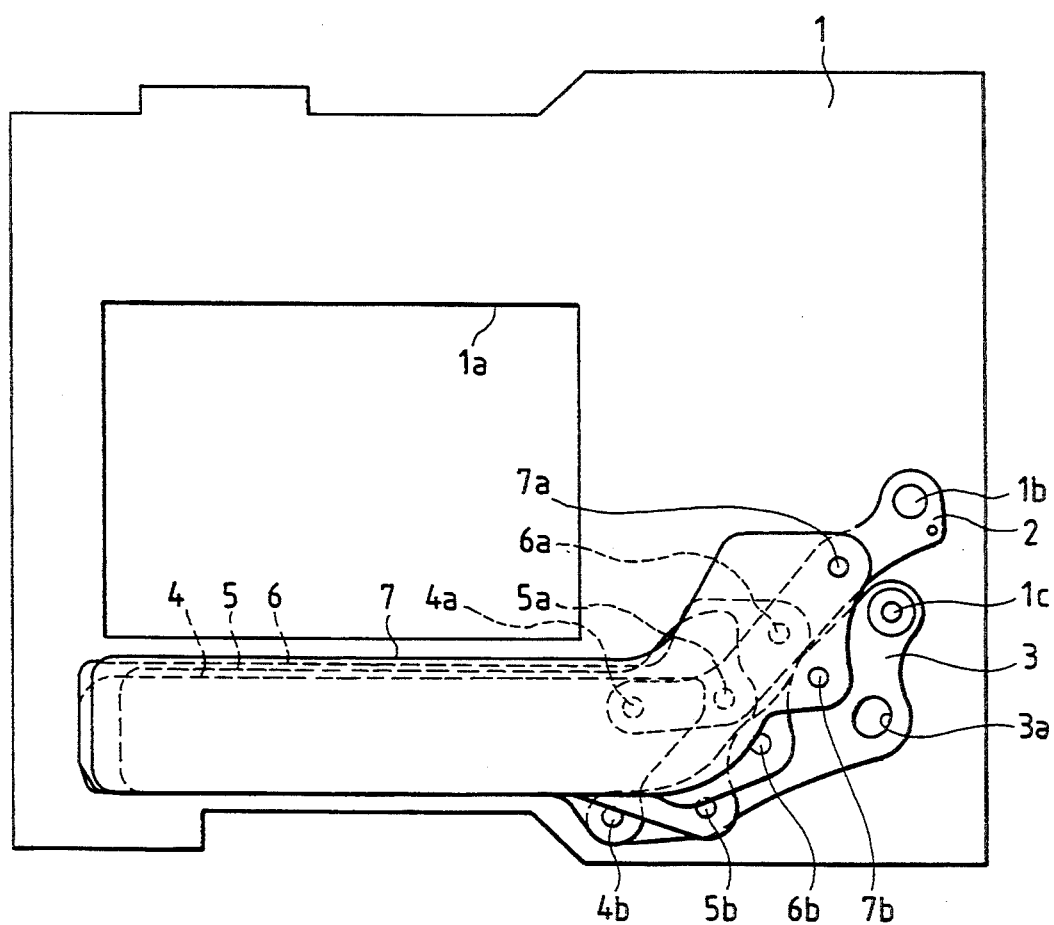

FIGS. 1 to 3 and 7 illustrate an embodiment of the present invention, wherein components corresponding to those in the above-explained prior art are represented by corresponding numbers.

The slit blade 4 and the cover blades 5, 6, 7 are driven by a pin fitted in a hole 3a of the driving arm 3, but such driving method is already known and will not, therefore, be explained further. Also, in a focal plane shutter, the shutter base plate 1 is provided with another set of the slit blade 4 and the cover blades 5, 6, 7 and these two sets of blades are respectively used as a leading curtain and a trailing curtain, but, for the purpose of simplicity, there is illustrated only a set of blades.

In a state shown in FIG. 1, where the slit blade 4 and the cover blades 5, 6, 7 are retracted from the aperture 1a and are mutually superposed, the pins 4a, 5a, 6a are superposed respectively with the cover blades 5, 6, 7. Also the pins 4b, 5b, 6b are in similarly superposed states.

Figure 3:
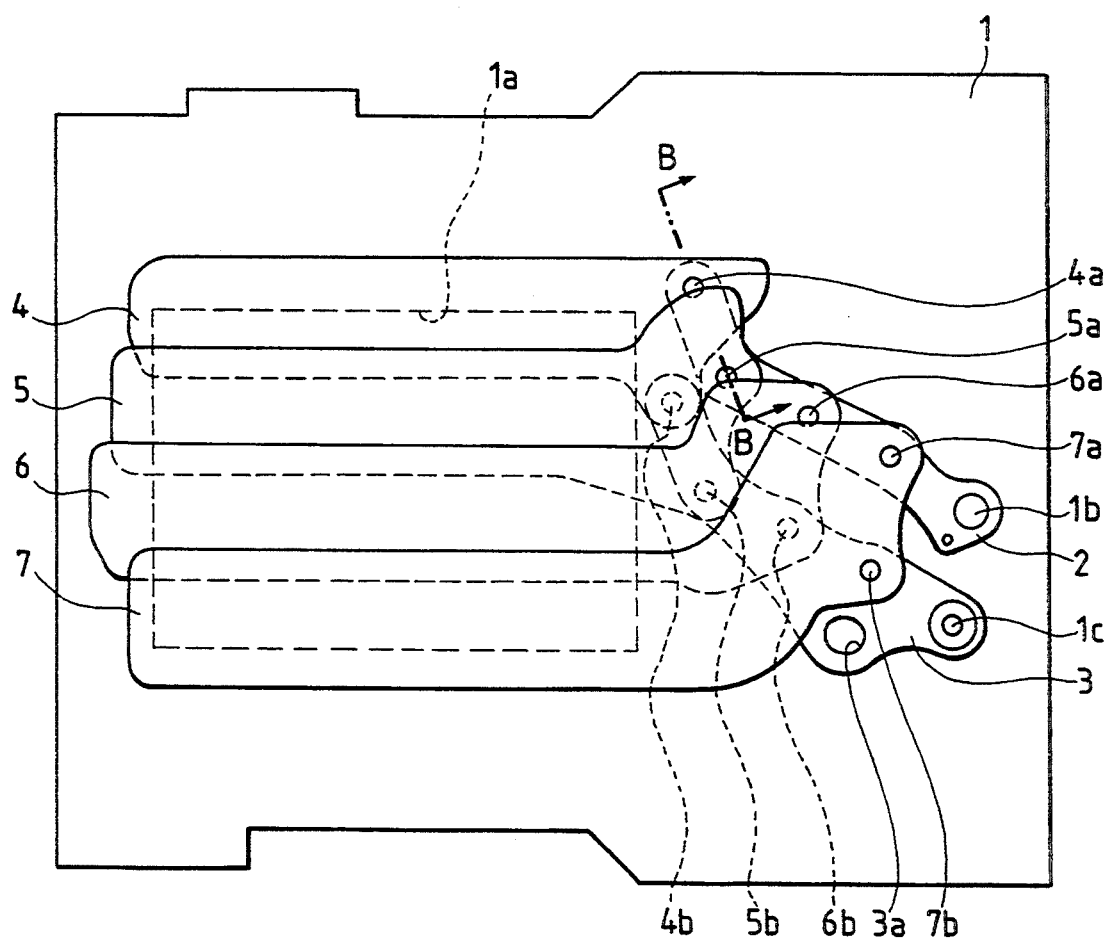
Figure 4:
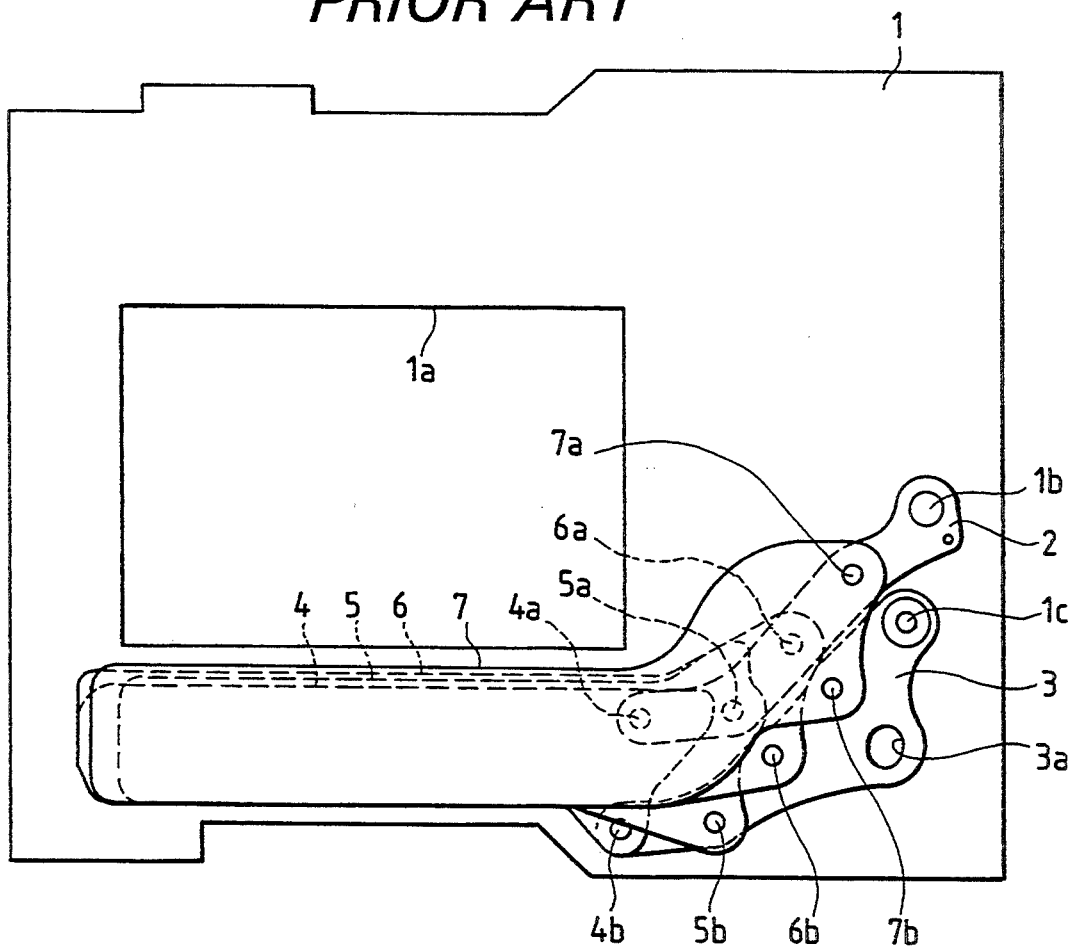
Figure 5:
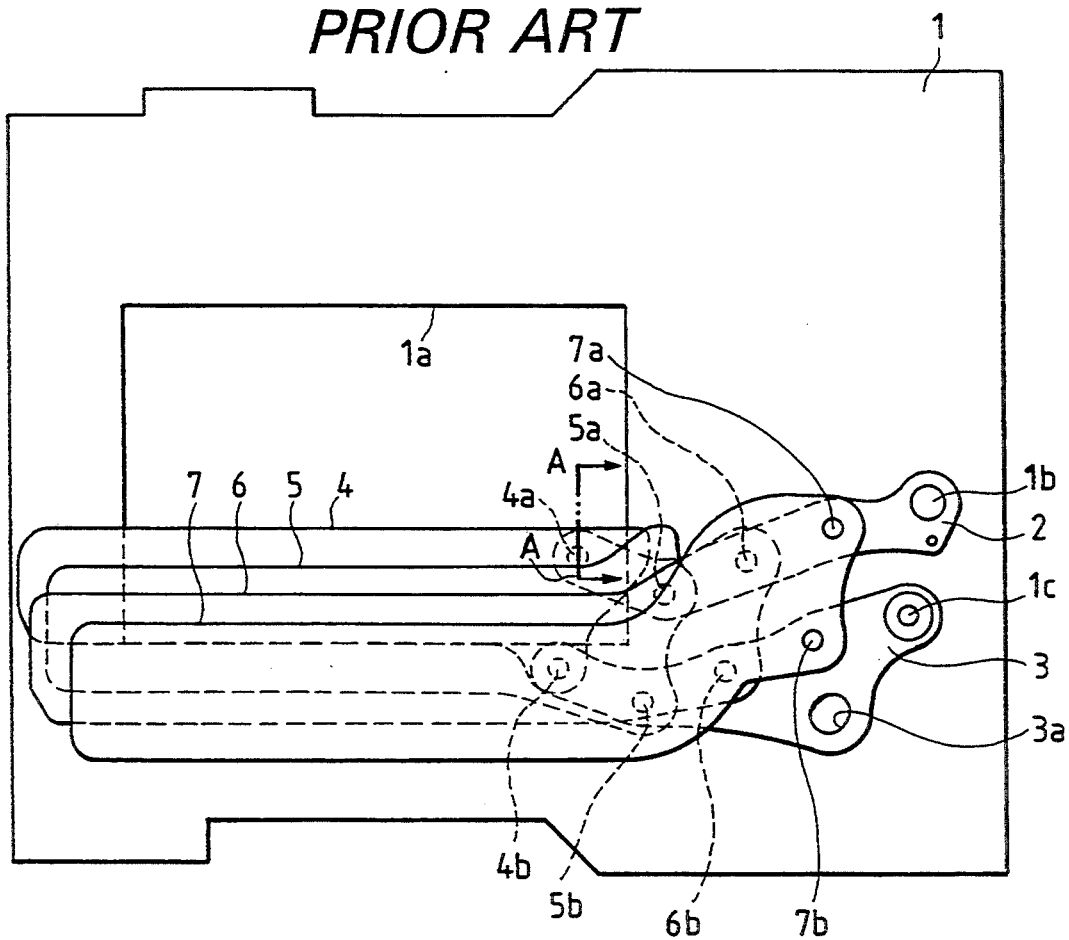
FIG. 5 is a view of the conventional shutter blade device in a state in which the shutter blades thereof are in a running motion.
Figure 6:
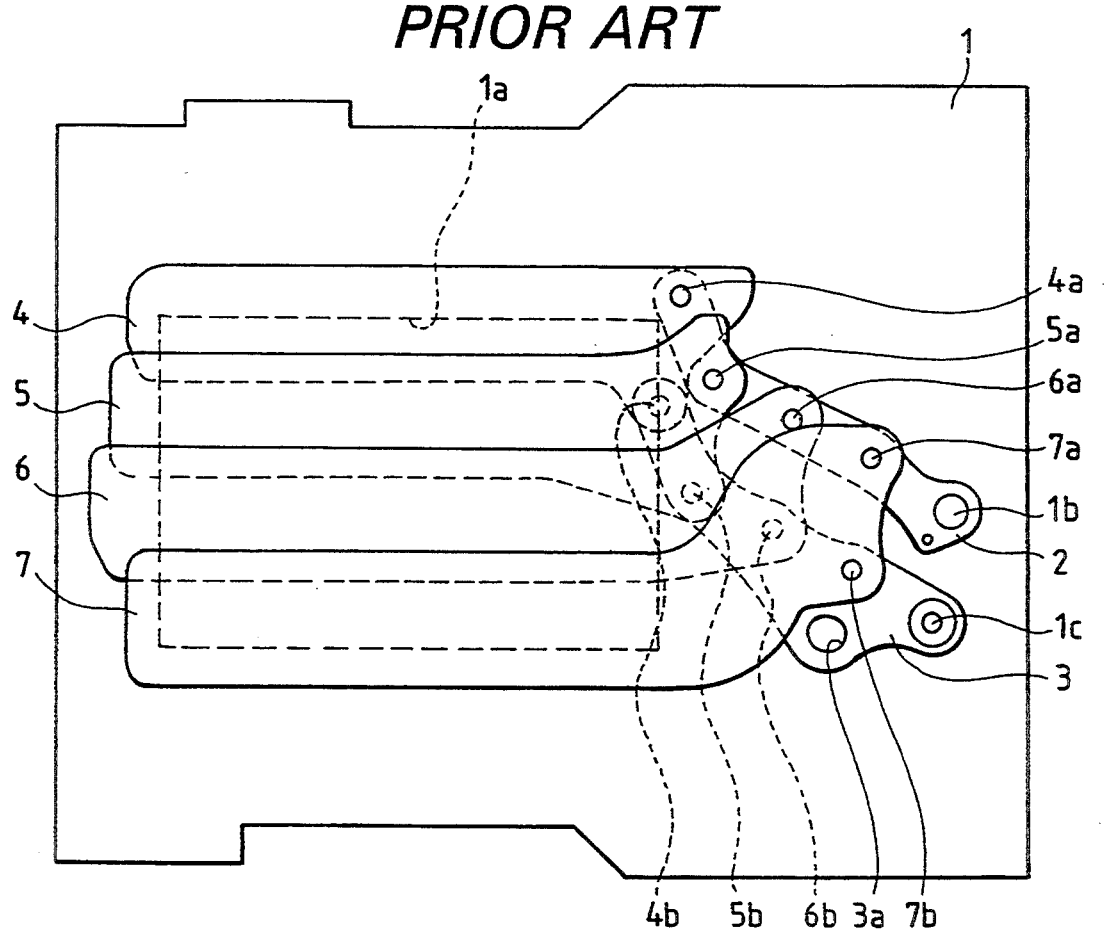

Also in a state shown in FIG. 3, where the slit blade 4 and the cover blades 5, 6, 7 are extended to cover the aperture 1a, the pins 4a, 5a, 6a, 4b, 5b, 6b are still superposed with the adjacent blades 5, 6, 7.

Figure 2:
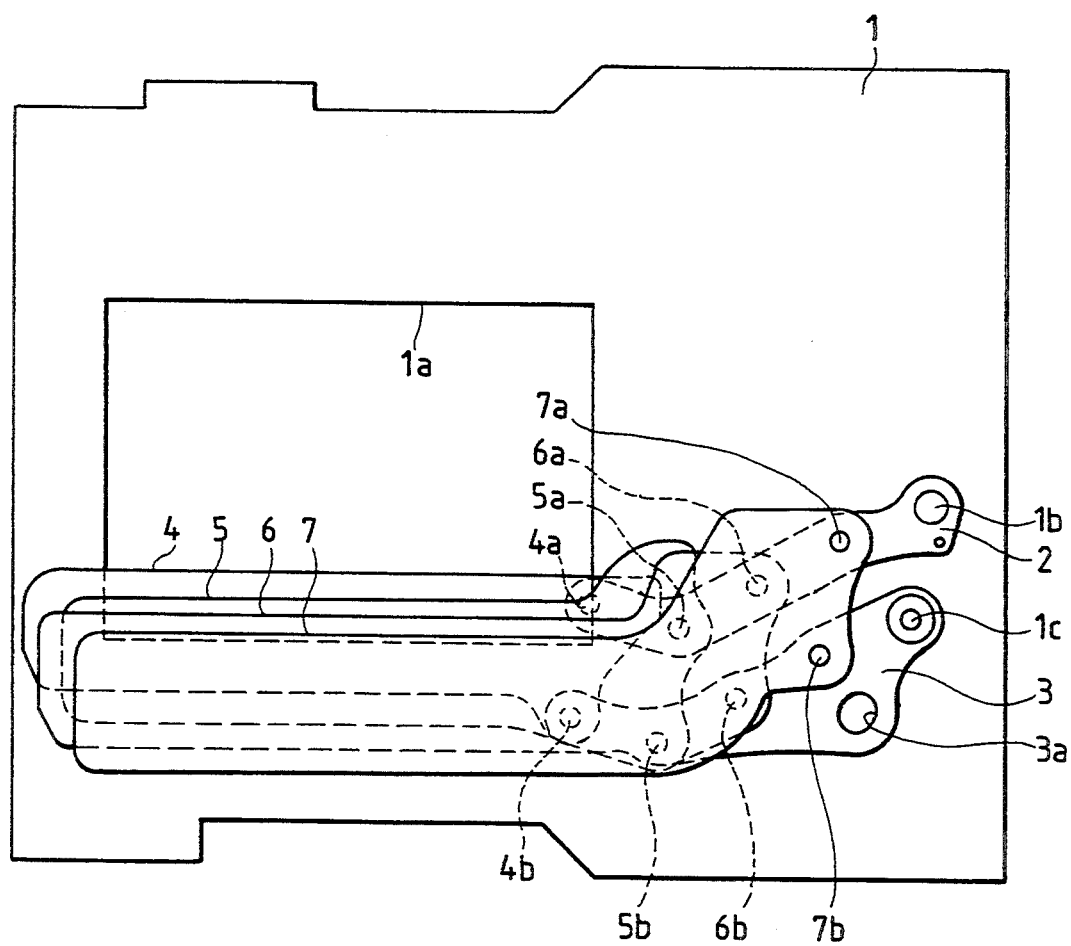
FIG. 2 is a view of the shutter blade device embodying the present invention, in a state in which the shutter blades thereof are in a running motion.
Figure 8:
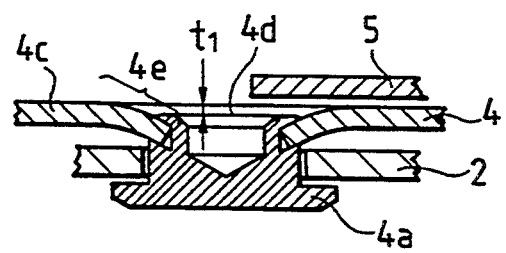
FIG. 8 is a cross-sectional view along a line A—A in FIG. 5.

The shutter blades are so formed that the pins 4a, 5a, 6a, 4b, 5b, 6b are always superposed respectively with the adjacent shutter blades in any position of the slit blade 4 and the cover blades 5, 6, 7 in the course of running motion or shutter charging motion, as shown in FIG. 2. In combination with such blade forms, there is employed a caulking method not requiring the bent portion 4e shown in FIG. 8.

Figure 7:
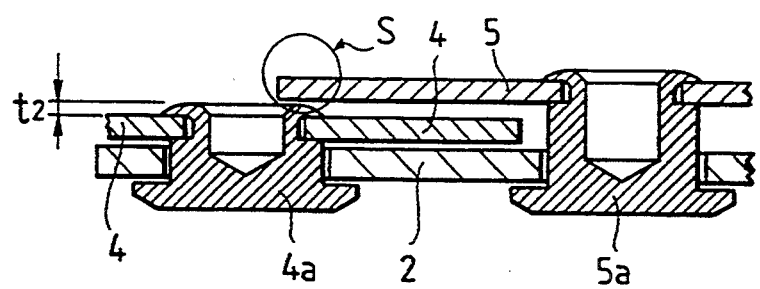
FIG. 7 is a cross-sectional view along a line B—B in FIG. 3.
Figure 9:
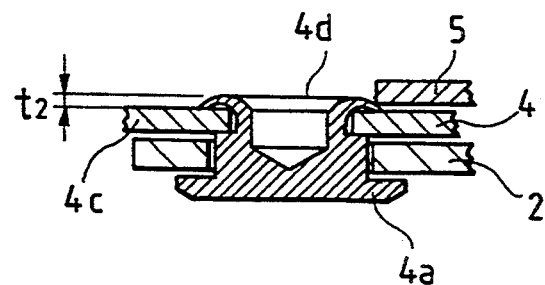
FIG. 9 is a view showing the drawback in the prior art.

FIG. 7 is a cross-sectional view along a line B—B in FIG. 3 showing such caulking method. As shown in FIG. 7, the slit blade 4 and the cover blade 5 can be caulked in a planar state. Also the damage of the blade by collision, as explained in relation to FIG. 9, can be prevented since the protruding portion t2 of the caulking and the cover blade 5 are always superposed in a portion S.

In a shutter blade made of a carbon fiber composite material, it is almost impossible, unlike in the case of metallic materials, to form the bent portion 4e in advance by plastic working, so that it is difficult to achieve caulking by forming the bent portion 4e while maintaining the planarity of the blade and the production yield is inevitably lowered. However, in the present invention, even with said carbon fiber composite material, the planarity of the blade can be easily maintained as it can be caulked in planar state, so that the production yield is improved and the shutter blade device can be provided inexpensively.

What is claimed is:

1. A shutter blade device, comprising:
   a shutter base plate having an aperture formed therein;
   light-shielding shutter blades for exposing or closing said aperture of said shutter base plate; and
   a pair of drive arms rotatably mounted on said shutter base plate and each linked to each shutter blade by corresponding caulking pins for causing said shutter blades to effect said exposing/closing of said aperture, each caulking pin being caulked at a planar portion of the corresponding shutter blade such that said shutter blades are rotatable with respect to said drive arm;
   wherein each caulking pin has a caulked portion protruding to a side of the corresponding shutter blade opposite a side thereof which faces the corresponding drive arm, and said shutter blades are so formed that every caulking pin protruding portion which at least partially overlaps a shutter blade adjacent thereto in any position of the corresponding shutter blade is maintained at least partially overlapped with said adjacent shutter blade in all positions of the corresponding shutter blade.

2. A method of mounting shutter blades of a shutter device provided with a shutter base plate having an aperture, comprising the steps of:
   (a) providing said shutter base plate with rotatable drive arms;
   (b) caulking each drive arm to a planar portion of each shutter blade with corresponding caulking pins such that the shutter blades are rotatable with respect to the drive arms, with each caulking pin having a caulked portion protruding to a side of the corresponding shutter blade opposite a side thereof facing the corresponding drive arm, and with the caulking pins being disposed such that every caulking pin protruding portion which at least partially overlaps a shutter blade adjacent thereto in any position of the corresponding shutter blade is maintained at least partially overlapped with the adjacent shutter blade in all positions of the corresponding shutter blade.

3. A shutter blade device, comprising:
   a shutter base plate having an aperture formed therein;
   light-shielding shutter blades for exposing or closing said aperture of said shutter base plate;
   a pair of drive arms rotatably mounted on said shutter base plate; and
   link means linking said drive arms with said shutter blades for causing said shutter blades to effect said exposing/closing of said aperture with rotation of said drive arms, said link means including link portions corresponding to each shutter blade rotatably linking the shutter blade to said drive arms;
   wherein each link portion protrudes to a first side of the corresponding shutter blade opposite a second side thereof which faces the corresponding drive arm, and said shutter blades are so formed that every link portion which at least partially overlaps a shutter blade adjacent to said first side of the corresponding shutter blade in any position of the corresponding shutter blade is maintained at least partially overlapped with said adjacent shutter blade in all positions of the corresponding shutter blade.

* * * * *